(12) United States Patent
Barnes et al.

(10) Patent No.: US 10,140,100 B2
(45) Date of Patent: Nov. 27, 2018

(54) DEVICE COMMON MODEL INTERFACE

(71) Applicant: Google Inc., Mountain View, CA (US)

(72) Inventors: Robert Barnes, Erie, CO (US); John Kozura, Boulder, CO (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/449,372

(22) Filed: Mar. 3, 2017

(65) Prior Publication Data

US 2017/0255452 A1     Sep. 7, 2017

Related U.S. Application Data

(60) Provisional application No. 62/304,013, filed on Mar. 4, 2016.

(51) Int. Cl.
| | |
|---|---|
| *G06F 9/44* | (2018.01) |
| *G06F 8/35* | (2018.01) |
| *H04L 12/24* | (2006.01) |
| *G06F 8/10* | (2018.01) |
| *H04L 29/08* | (2006.01) |
| *G06F 8/20* | (2018.01) |
| *H04L 29/06* | (2006.01) |

(52) U.S. Cl.
CPC ............ *G06F 8/35* (2013.01); *G06F 8/10* (2013.01); *G06F 8/24* (2013.01); *H04L 41/0233* (2013.01); *H04L 67/1097* (2013.01); *H04L 67/12* (2013.01); *H04L 69/18* (2013.01); *H04L 67/10* (2013.01)

(58) Field of Classification Search
CPC ........................................................ G06F 8/35

USPC ........................................................ 717/104
See application file for complete search history.

(56) References Cited

U.S. PATENT DOCUMENTS

| | | | | |
|---|---|---|---|---|
| 8,386,493 B2* | 2/2013 | Muni | ................ | G06F 17/30292 707/740 |
| 2002/0138582 A1* | 9/2002 | Chandra | ................ | G06Q 10/10 709/206 |
| 2003/0131069 A1* | 7/2003 | Lucovsky | ............. | G06F 21/335 709/217 |
| 2003/0182083 A1* | 9/2003 | Schwenke | .............. | G05B 17/02 702/183 |
| 2004/0128120 A1* | 7/2004 | Coburn | .................. | G05B 17/02 703/26 |
| 2005/0091231 A1* | 4/2005 | Pal | .................... | G06F 17/30011 |
| 2005/0223392 A1* | 10/2005 | Cox | ........................ | G06Q 10/06 719/328 |

(Continued)

*Primary Examiner* — Chameli Das
(74) *Attorney, Agent, or Firm* — Colby Nipper

(57) ABSTRACT

A device common model interface is described that translates a schema describing a resource in a fabric network into a common object model and one or more target-specific data models, using a specification of a target application environment and a specification of a communication protocol. Elements of the schema that are useful for an application are extracted to generate the common object model and the one or more target-specific data models are provided to the application. The application interacts with an interface of the resource using the API of the target-specific data model, which performs operations that are specific to communicating with the resource in the target application environment and using the communication protocol.

20 Claims, 11 Drawing Sheets

(56) References Cited

U.S. PATENT DOCUMENTS

| | | | |
|---|---|---|---|
| 2011/0209181 A1* | 8/2011 | Gupta | H04N 7/163 |
| | | | 725/62 |
| 2012/0078913 A1* | 3/2012 | Muni | G06F 17/303 |
| | | | 707/740 |
| 2014/0379817 A1* | 12/2014 | Logue | G06Q 10/107 |
| | | | 709/206 |
| 2015/0312348 A1* | 10/2015 | Lustgarten | H04L 67/12 |
| | | | 705/14.66 |
| 2016/0323143 A1* | 11/2016 | Kim | G06F 9/441 |

* cited by examiner

DEVICE COMMON MODEL INTERFACE

RELATED APPLICATION

This application claims priority to U.S. Provisional Patent Application Ser. No. 62/304,013 filed Mar. 4, 2016, entitled "Device Common Model Interface," the disclosure of which is incorporated by reference herein in its entirety.

BACKGROUND

Distributed computing systems, including wireless mesh networks, are used to connect devices to each other, and to cloud-based services. These distributed computing systems are increasingly popular for sensing environmental conditions, controlling equipment, and securely providing information, control, and alerts to users via applications connected to the cloud-based services. A distributed computing system includes a variety of devices that use varying communication protocols and with varying amounts of power, computing, memory, and networking resources. User applications are supported on a variety of target devices and programming environments to provide users ready access to devices and services in the distributed computing systems.

SUMMARY

This summary is provided to introduce simplified concepts of a device common model interface. The simplified concepts are further described below in the Detailed Description. This summary is not intended to identify essential features of the claimed subject matter, nor is it intended for use in determining the scope of the claimed subject matter.

A device common model interface is described, as generally related to a code generation system for translating a schema, describing a resource in a distributed computing system, into a common object model and one or more target-specific data models. The code generation system extracts elements of the schema that are usable by an application to generate the common object model and represents the extracted elements independent of any details of an underlying communication protocol. The code generation system provides the target-specific data model to the application. The application interacts with the resource by using the API of the target-specific data model to perform operations that are specific to communicating with an interface of the resource in the target application environment and using the communication protocol.

The device common model interface is further described, as generally related to a method for translating a schema describing a resource in a fabric network into a common object model and one or more target-specific data models. The method extracts elements of the schema that are usable by an application to generate the common object model and represents the extracted elements independent of any details of an underlying communication protocol. The method provides the target-specific data model to the application. The application interacts with the resource by using the API of the target-specific data model to perform operations that are specific to communicating with an interface of the resource in the target application environment and using the communication protocol.

BRIEF DESCRIPTION OF THE DRAWINGS

Embodiments of a device common model interface are described with reference to the following drawings. The same numbers are used throughout the drawings to reference like features and components.

DETAILED DESCRIPTION

Figure 1:
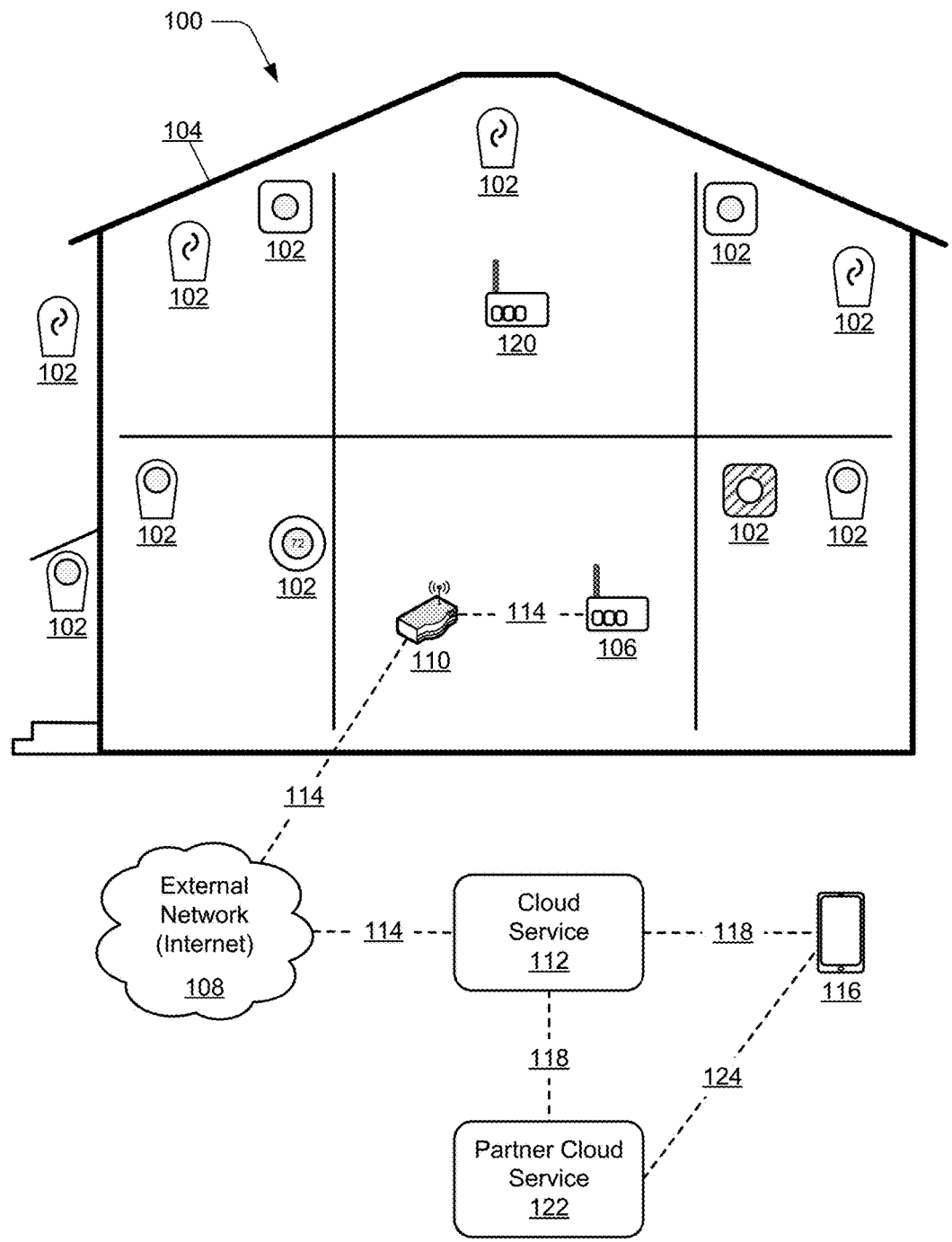
FIG. 1 illustrates an example distributed computing system in which various aspects of the device common model interface can be implemented.

Distributed computing systems provide home automation with low-power devices and wireless networks connected to cloud-based services and web-connected user applications. Devices in the distributed computing system are heterogeneous and built with varying capabilities. The hosts or devices included in the distributed computing system range from battery-powered, microcontroller-based devices, which sleep periodically to conserve battery power, to line-powered devices with always-on connectivity in the home, to server farms hosting cloud-based services.

Devices in the distributed computing system may use various communications protocols for communication with services, user applications, and other devices. The devices may be provided by a number of different manufacturers that provide devices and manufacturer-specific cloud services, as well as communicating with cloud services provided by domain-specific service providers, such as home automation service providers, security service providers, and so forth. Developers of user applications (i.e., "apps" or "mobile apps") in the distributed computing system may need to support various user application platforms that communicate with devices and/or services from the various manufacturers and that use various communication protocols.

The combinations and permutations of device capabilities, communication protocols, and target user devices complicate the development and testing of user applications for an application developer. The device common model interface provides data models for application access to devices and resources in the distributed computing environment. The device common model interface also provides application developers access to a common object model of device and resource interfaces that abstracts away the details of communication protocols from the interfaces used by the application developer.

The device common model interface increases the efficiency of application development by enabling the developer to develop application code that is communication protocol-agnostic, thus eliminating the need to develop custom code specific to each protocol. The developer can focus on the application and the capabilities of the device and/or resource used in the application without learning and implementing the details of underlying communication protocols. The common object model provides a common reference to particular traits of a particular device or resource that are useful for application development.

The device common model interface uses code generation to cleanly separate the common object model for client interaction from the underlying protocols that implement the interactions. The underlying protocols encompass message representations, request-response pairs, such as Remote Procedure Calls (RPCs), and sets of RPCs across a communication network. This separation of the common object model from the underlying protocols, which include state machines and complex multi-part interactions that make up the complete communications between systems, supports easily using multiple protocols in applications, as needed.

The device common model interface translates a schema, which need not include protocol-related information, for a device or resource to populate the data model(s) and common object model. The resulting models provide application interfaces that have strongly typed parameters. Bounds or limits on values are also provided in the data model(s). The application developer can validate an application earlier in development without time-consuming validation using the device and communications infrastructure that connects the application to the device. The bounds in the data model also enable the application developer to test out-of-range user entries and validate user interface messaging for those errors.

The device common model interface provides models of resources that are abstractions created by aggregating common traits from devices and/or other resources to provide useful functions or status for an application. The resources may be hosted in a device or in a cloud-based service, such as an occupancy status of a structure derived from sensor devices in the structure, a lighting level in a room that is an aggregate of lighting levels of lighting controller devices in the room, and so forth.

While features and concepts of the described systems and methods for the device common model interface can be implemented in any number of different environments, systems, devices, and/or various configurations, embodiments of the device common model interface are described in the context of the following example devices, systems, and configurations.

FIG. 1 illustrates an example distributed computing environment 100 in which aspects of the device common model interface can be implemented. The distributed computing environment 100 (e.g., a fabric network) includes a home area network (HAN) such as a mesh network 200, described below with respect to FIGS. 2 and 3. The HAN includes mesh network devices 102 that are disposed about a structure 104, such as a house, and are connected by one or more wireless and/or wired network technologies, as described below. The HAN includes a border router 106 that connects the HAN to an external network 108, such as the Internet, through a home router or access point 110.

To provide user access to functions implemented using the mesh network devices 102 in the HAN, a cloud service 112 connects to the HAN via border router 106, via a secure tunnel 114 through the external network 108 and the access point 110. The cloud service 112 facilitates communication between the HAN and internet clients 116, such as apps on mobile devices, using a web-based application programming interface (API) 118. The cloud service 112 also manages a home graph that describes connections and relationships between the mesh network devices 102, elements of the structure 104, and users. The cloud service 112 also hosts controllers which orchestrate and arbitrate home automation experiences.

The mesh network devices 102, the cloud service 112, and the internet clients 116 collectively communicate in a fabric network that includes one or more logical networks to manage communication between the devices and services. The fabric network is described in U.S. patent application Ser. No. 13/926,302 entitled "Fabric Network" filed Jun. 25, 2013, the disclosure of which is incorporated by reference herein in its entirety.

The HAN may include one or more mesh network devices 102 that function as a hub 120. The hub 120 may be a general-purpose home automation hub, or an application-specific hub, such as a security hub, an energy management hub, an HVAC hub, and so forth. The functionality of a hub 120 may also be integrated into any mesh network device 102, such as a smart thermostat device or the border router 106. In addition to hosting controllers on the cloud service 112, controllers can be hosted on any hub 120 in the structure 104, such as the border router 106. A controller hosted on the cloud service 112 can be moved dynamically to the hub 120 in the structure 104, such as moving an HVAC zone controller to a newly installed smart thermostat.

Hosting functionality on the hub 120 in the structure 104 can improve reliability when the user's internet connection is unreliable, can reduce latency of operations that would normally have to connect to the cloud service 112, and can satisfy system and regulatory constraints around local access between mesh network devices 102.

The mesh network devices 102 in the HAN may be from a single manufacturer that provides the cloud service 112 as well, or the HAN may include mesh network devices 102 from partners. These partners may also provide partner cloud services 122 that provide services related to their mesh network devices 102 through a partner Web API 124. The partner cloud service 122 may optionally or additionally provide services to internet clients 116 via the web-based API 118, the cloud service 112, and the secure tunnel 114.

The distributed computing environment 100 can be implemented on a variety of hosts, such as battery-powered microcontroller-based devices, line-powered devices, and servers hosting cloud services. Protocols operating in the mesh network devices 102 and the cloud service 112 provide a number of services that support operations of home automation experiences in the distributed computing environment 100. These services include, but are not limited to, real-time distributed data management and subscriptions, command-and-response control, real-time event notification, historical data logging and preservation, cryptographically controlled security groups, time synchronization, network and service pairing, and software updates.

Figure 2:
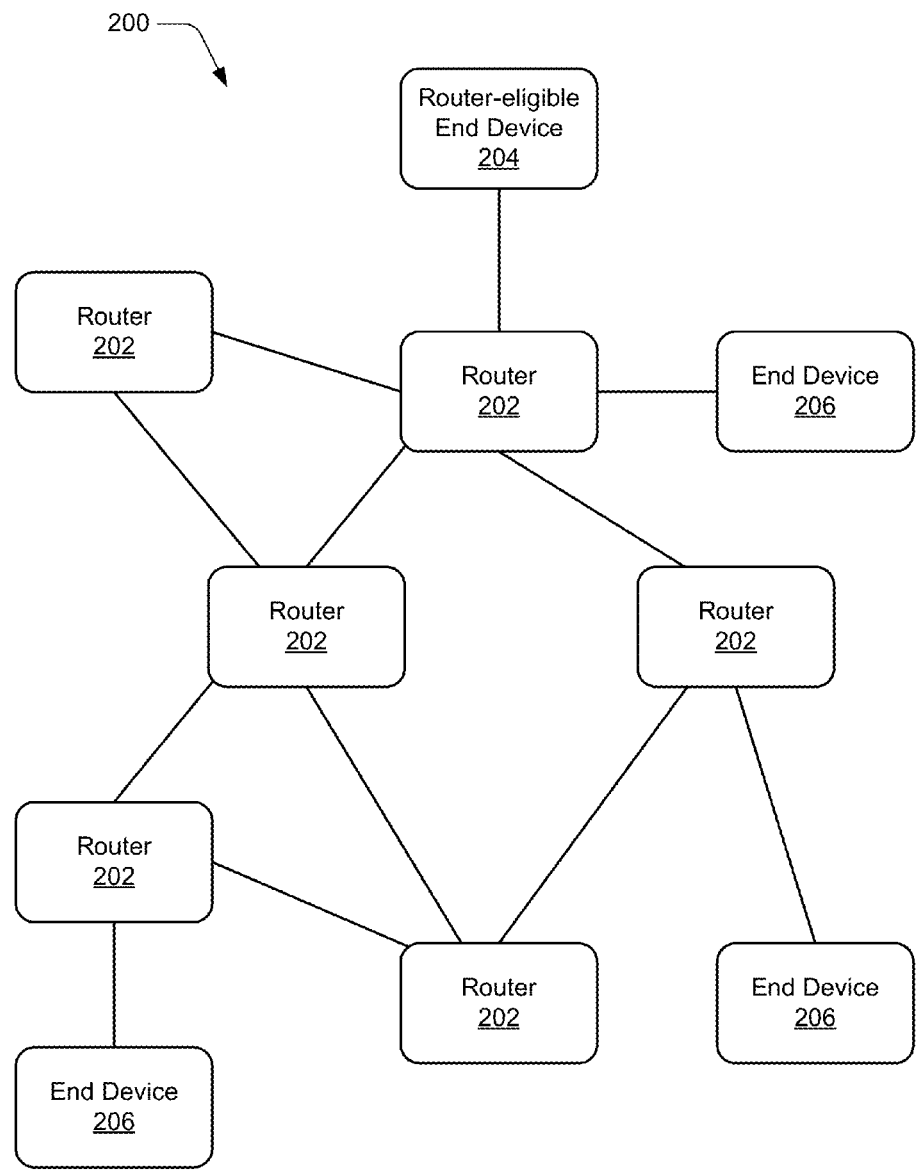
FIG. 2 illustrates an example mesh network system in which various aspects of the device common model interface can be implemented.

FIG. 2 illustrates an example mesh network 200 that implements the HAN in the distributed computing environment 100. The mesh network 200 is a wireless mesh network that includes routers 202, a router-eligible end device 204, and end devices 206. The routers 202, the router-eligible end device 204, and the end devices 206, each include a mesh network interface for communication over the mesh network. The routers 202 receive and transmit packet data over the mesh network interface. The routers 202 also route traffic across the mesh network 200. The routers 202 and the router-eligible end devices 204 can assume various roles, and combinations of roles, within the mesh network 200, as discussed below.

The router-eligible end devices 204 are located at leaf nodes of the mesh network topology and are not actively routing traffic to other nodes in the mesh network 200. The router-eligible device 204 is capable of becoming a router 202 when the router-eligible device 204 is connected to additional devices. The end devices 206 are devices that can communicate using the mesh network 200, but lack the capability, beyond simply forwarding to its parent router 202, to route traffic in the mesh network 200. For example, a battery-powered sensor is one type of end device 206.

The routers 202, the router-eligible end device 204, and the end devices 206 include network credentials that are used to authenticate the identity of these devices as being a member of the mesh network 200. The routers 202, the router-eligible end device 204, and the end devices 206 also use the network credentials to encrypt communications in the mesh network.

During sleep periods, a child end device 206 that sleeps is not available on the mesh network 200 to receive data packets addressed to the child end device 206. The child end device 206 attaches to a parent router 202, which responds, on behalf of the child end device 206, to mesh network traffic addressed to the child end device 206.

The child end device 206 also depends on the parent router 202 to receive and store all data packets addressed to the child device 206, including commissioning datasets, which may be received while the child end device 206 is sleeping. When the child end device 206 awakes, the stored data packets are forwarded to the child end device 206. The parent router 202 responding on behalf of the sleeping child end 206 device ensures that traffic for the child end device 206 is handled efficiently and reliably on the mesh network 200, as the parent router 202 responds to messages sent to the child end device 206, which enables the child end device to operate in a low-power mode for extended periods of time to conserve power.

Figure 3:
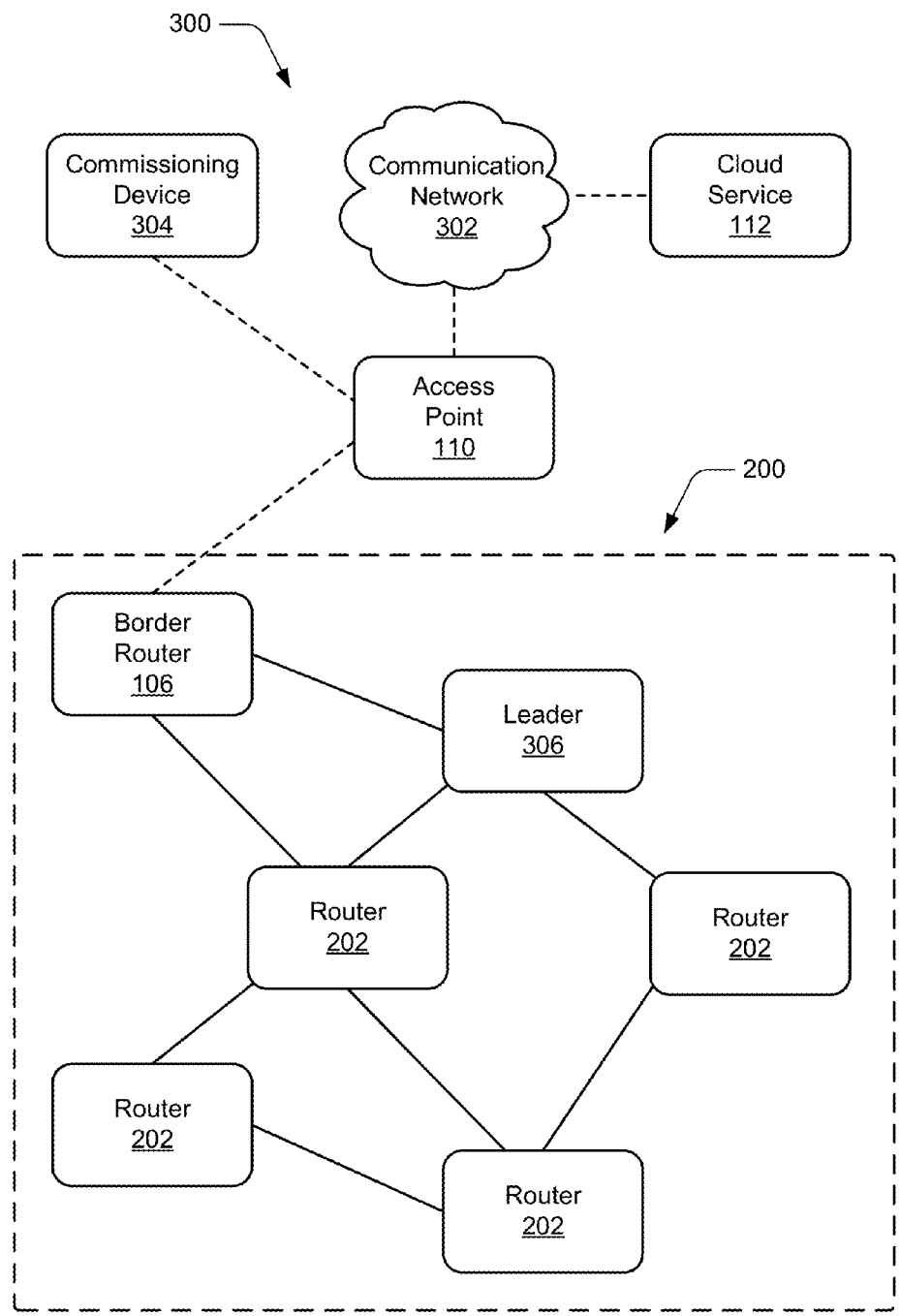
FIG. 3 illustrates an example environment in which various aspects of the device common model interface can be implemented.

FIG. 3 illustrates an example environment 300 in which various aspects of the device common model interface can be implemented. The environment 300 includes the mesh network 200 as shown and described with reference to FIG. 2, in which some routers 202 are performing specific roles in the mesh network 200. The devices within the mesh network 200, as illustrated by the dashed line, are communicating securely over the mesh network 200, using the network credentials.

The border router 106 (also known as a gateway and/or an edge router) is one of the routers 202. The border router 106 includes a second interface for communication with an external network, outside the mesh network 200. The border router 106 connects to an access point 110 over the external network. For example, the access point 110 may be an Ethernet router, a Wi-Fi access point, or any other suitable device for bridging different types of networks. The access point 110 connects to a communication network 302, such as the Internet. The cloud service 112, which is connected via the communication network 302, provides services related to and/or using the devices within the mesh network 200. By way of example, and not limitation, the cloud service 112 provides applications that include connecting end user devices (internet clients), such as smart phones, tablets, and the like, to devices in the mesh network 200, processing and presenting data acquired in the mesh network 200 to end users, linking devices in one or more mesh networks 200 to user accounts of the cloud service 112, provisioning and updating devices in the mesh network 200, and so forth.

A user choosing to commission and/or configure devices in the mesh network 200 uses a commissioning device 304, which connects to the border router 106 via the external network technology of the access point 110, to commission and/or configure the devices. The commissioning device 304 may be any computing device, such as a smart phone, tablet, notebook computer, and so forth, with a suitable user interface and communication capabilities to execute applications that control devices to the mesh network 200. Only a single commissioning device 304 may be active (i.e., an active commissioner) on the mesh network 200 at one time.

One of the routers 202 performs the role of a leader 306 for the mesh network 200. The leader 306 manages router identifier assignment and the leader 306 is the central arbiter of network configuration information for the mesh network 200. The leader 306 propagates the network configuration information to the other devices in the mesh network 200. The leader 306 also controls which commissioning device is accepted as a sole, active commissioner for the mesh network 200, at any given time.

Figure 4:
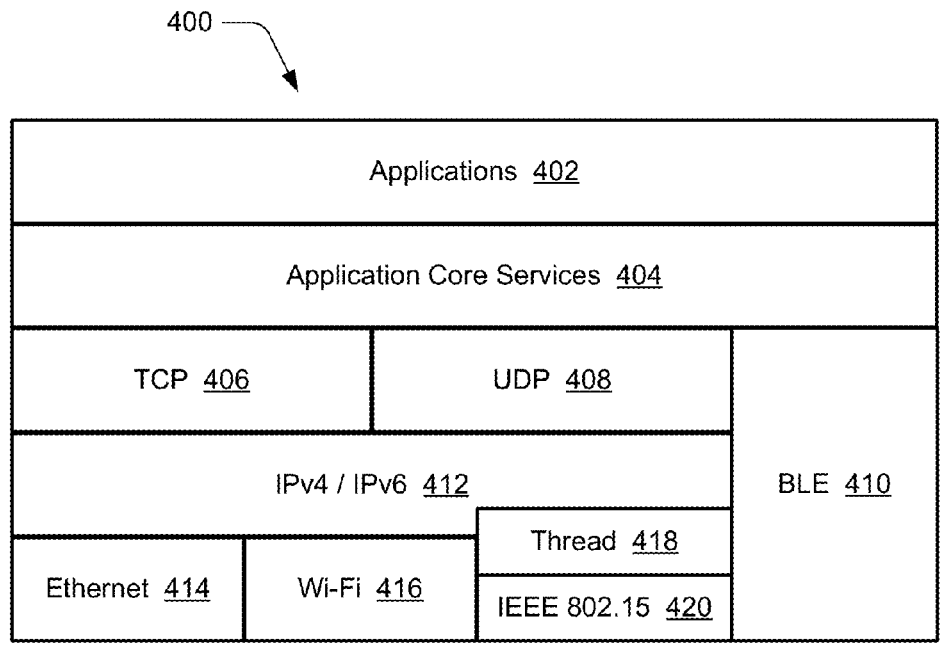
FIG. 4 illustrates an example multi-protocol networking stack architecture in which various aspects of the device common model interface can be implemented.

FIG. 4 illustrates an example of a multi-protocol networking stack architecture 400 for the device common model interface. The multi-protocol networking stack architecture 400 illustrates the use of multiple communication protocols, such as in the distributed computing environment 100 as shown and described with reference to FIG. 1. The multi-protocol networking stack architecture 400 specifies a networking framework for how applications 402 communicate with devices. The applications 402 reside at the top layer of the multi-protocol networking stack architecture 400 and are supported by various application core services 404 that provide services such as security, message and connection management, and management of networking state.

Below the application core services layer 404, multiple transport protocols are supported to provide transparent transfer of data and to control how the transparent transfer of the data remains reliable. Example transport protocols that may be employed include Transmission Control Protocol (TCP) 406 and User Datagram Protocol (UDP) 408, for communications using Internet Protocol (IP), and Bluetooth Low Energy (BLE) 410. IP-based communications may use any suitable combination of IP version 4 and/or IP version 6, shown as IPv4/IPv6 at 412. The use of BLE in a fabric network is described in U.S. patent application Ser. No. 15/182,476 entitled "Establishing a Connection over a Low Power Communication Type" filed Jun. 14, 2016, the disclosure of which is incorporated by reference herein in its entirety.

Data link and physical communication protocols reside at the lowest layers of the multi-protocol networking stack architecture 400. The various data link and physical communication protocols include Ethernet 414, Wi-Fi 416, and/ or Thread 418 over IEEE 802.15.4, item 420. The Thread 418 networking stack is described in U.S. patent application Ser. No. 13/926,335 entitled "Efficient Communication for Devices of a Home Network" filed Jun. 25, 2013, the disclosure of which is incorporated by reference herein in its entirety.

Figure 5:
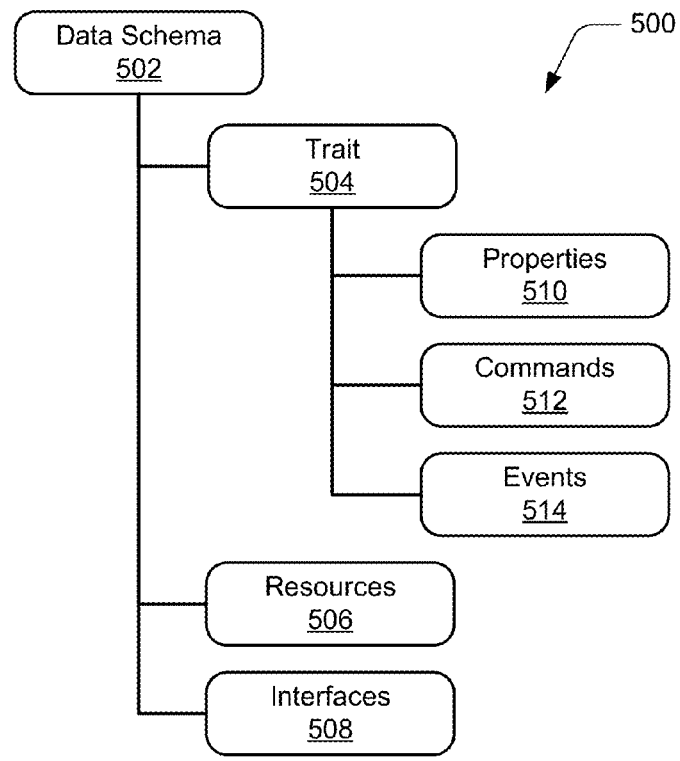
FIG. 5 illustrates an example of a data schema in a distributed computing system in accordance with techniques to implement the device common model interface.

FIG. 5 illustrates an example resource model 500 for the device common model interface. The resource model 500 illustrates a data schema 502 that supports the protocols and operations of the mesh network devices 102 and the cloud service 112, as shown and described with reference to FIG. 1. The data schema 502 describes functionality of devices, as well as the services and clients that interact with the devices. The data schema 502 includes traits 504, resources 506, and interfaces 508. The traits 504 describe small, composable units of functionality, which include properties 510, commands 512, and events 514, along with a semantic understanding of how the traits 504 operate to implement the functionality.

The data schema 502 is expressed using a description language, such as Protocol Buffers. The description language describes the traits 504, resources 506, and interfaces 508 in a programming language-neutral, platform-neutral manner. The data schema 502 is stored in any suitable manner, such as a file or document stored in a memory device of the devices described with respect to FIGS. 11 and 12.

The properties 510 are characteristics of the trait 504 that represent the state of a resource, for example, the brightness of a light or whether someone is home. The properties 510 are typed, and a label and numeric tag are used to communicate each property 510. For example, the types of the properties include Boolean, integer, unsigned integer, enumerated, number, string, string reference, bytes, structures, lists, maps, and so forth. The properties 510 may also have metadata indicating constraints, readability, and/or serialization specifics. The properties 510 are operated on using state management commands and three events: observe, update, and notify. State management is the primary means of command and control for the mesh network devices 102.

The commands 512 are requests for action sent to the trait 504 with an expected response. While most operations are managed using the properties 510 with the standard state commands of "observe" and "update", a subset of operations are not amenable to property management. For example, a NextTrack( ) command on a media player trait requests changes to the properties 510 that the client could not compute, and a ScanNetwork( ) command on a Wi-Fi trait is requesting results with no property effects. The command 512 has request parameters and expected response parameters.

The event 514 is a unidirectional assertion of truth about a trait 504 at a specific time. This mechanism is used to asynchronously communicate occurrences on the trait 504 to other actors in the distributed computing system 100. Most events 514 are related to property changes and communicated with a standard notify event. Other events 514 can communicate arbitrary, non-property-based occurrences, such as ringing a doorbell. Multiple events 514 may be correlated to enable composition across the traits 504, for example, a pincode entry event could be correlated with an unlock event indicating that the pincode caused a door to unlock. The events 514 consist of parameters and a timestamp.

The properties 510, commands 512, and events 514 work together to define a comprehensive mechanism for interacting with the traits 504. Settings and actions are primarily handled through property management, with the commands 512 for handling requests that are not amenable to the properties 510. For example, a brightness property on a lighting trait would be updated by a client to change the brightness on a physical device. An operation such as scanning Wi-Fi networks or skipping a track on a music player would use the command 512. A notification of changes on a specific entity is conveyed through property notifications and general purpose events 514, which clients may subscribe to and monitor.

The resource 506 is a group of the traits 504 and interfaces 508 that represent a logical or physical entity, such as a mesh network device 102, a structure 104, a user, or an external source of information, such as weather data. Each interface 508 is a combination of traits that operate together to provide a specific function. The traits 504 can be composed into the interfaces 508, which indicate how basic units of functionality work together to form a higher level of functionality. For example, a number of burners, controls, and on/off indicators may be composed to provide an interface for a stove. The traits 504 and instances of the interfaces 508 are collected into the resources 506, which describe all the functionality for an actor in the distributed computing environment 100, such as a device or room in the structure 104.

The interface 508 may be any aggregation of traits 504 that is a useful abstraction to an application or service. The interface 508 provides semantic meaning to the operation of the functionality of the aggregated traits 504. For example traits 504 from various devices may be aggregated to describe an abstraction, such as occupancy of the structure 104, a door in a room to determine whether the door is open or closed, whether a baby is napping in a nursery, and so forth. The abstraction may provide state information, may control a function, or both. The abstracted resource 506 may be hosted on a device in the structure 104, the hub 120 in the structure 104, and/or on a cloud-service 112. The application using the abstracted resource 506 uses the interface 508 provided in the data model without being required to have any knowledge of where the resource 506 is hosted.

Figure 6:
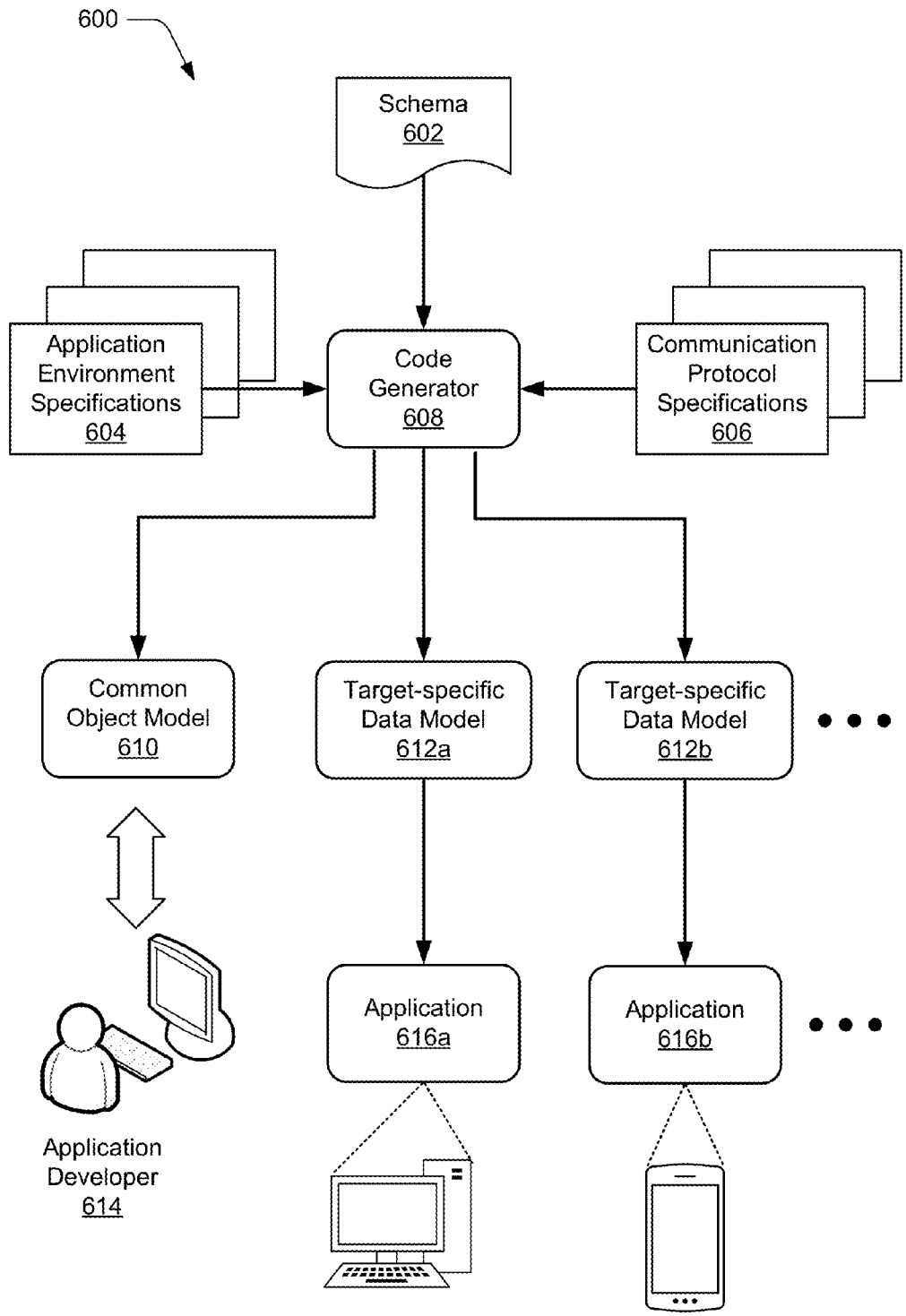
FIG. 6 illustrates an example of a code generation system in a distributed computing system in accordance with aspects of the device common model interface.

FIG. 6 illustrates an example code generation system 600 for the device common model interface. To facilitate ease of application development, the code generation system 600 generates a protocol-agnostic, common object model and target-specific data models. The common object model enables an application developer to generate an application without accounting for particular application environment-specific data models and/or communications protocols used to communicate with the devices and/or resources.

While the code generation system 600 is described in terms of an application developer using the generated protocol-agnostic, common object model and target-specific data models in a static fashion to code an application, the code generation system 600 may also be used dynamically for generic trait handling. Any host, such as the cloud service 112, the hub 120, any mesh network device 102, and the like, may read the data schema 502 or the trait 504 from a storage or memory and dynamically invoke the code generation system 600 to create a service that handles the trait 504 in a generic way.

The code generation system 600 receives a schema 602, which may be a schema related to a device or a resource. The code generation system 600 includes application environment specifications 604 and communication protocol specifications 606. The application environment specifications 604 and the communication protocol specifications 606 include data and instructions that are used by a code generator 608. The schema 602 may be received in any suitable manner, such as being retrieved from a memory device or a computer-readable storage memory of the devices described with respect to FIGS. 11 and 12, over a network from a service or a computer server, and so forth.

A developer may want to support a user application in multiple environments, such as a web-based environment with an interface for access from personal computers, services, and the like, as well as environments specific to a particular device or family of devices, such as Android-based or iOS-based mobile devices, and so forth. Each application environment may have specific programming language and interfacing requirements. For example, a web-based interface to a cloud service may use a representational state transfer (REST or RESTful) interface and an Android or iOS application may use an interface based on the gRPC Remote Procedure Call framework.

The data and instructions in the application environment specifications 604 may include operating system-specific information, programming language-specific information, Application Programming Interface (API) specific information, and the like for the application environments. For example, C++ for a mesh network device or Java for an Android device or cloud service. The information in the application environment specifications 604 may include APIs, data structures, code templates, virtual class definitions, and so forth, usable by the code generator 608 to translate the schema 602 for use in specific application environments.

The data and instructions in the communication protocol specifications 606 include information that describes how to communicate application data using the particular communication protocol. For example, the communication protocol specifications 606 include information describing message types, how to serialize or marshal application data for transmission in data packet formats supported by the communication protocol, patterns of message exchanges, and so forth. The information in the communication protocol specifications 606 may include packet structures, data structures, code templates, virtual class definitions, and so forth, usable by the code generator 608 to translate the schema 602 for use with specific communication protocols.

The code generator 608 produces a common object model 610 and one or more target-specific data models 612. The common object model 610 is accessible to an application developer 614 and presents a communication protocol-agnostic model of the traits 504, resources 506, and interfaces 508 included in the schema 602. By providing a common object model, the application developer 614 can develop applications 616 without being concerned with, and developing custom code for, the requirements imposed by each communication protocol and application environment combination. The code generator 608 extracts the elements of the schema 602 that are useful for the application developer 614 for inclusion in the common object model 610 and filters out elements of a resource and/or device that are supported for other purposes, such as maintenance. For example the code generator 608 may not include elements related to querying the firmware version of a device or applying a firmware update to the device.

For the schema 602, the code generator 608 produces target-specific data models 612 for the various combinations of application environments and communication protocols. The code generator 608 translates the schema 602 into classes and methods suitable for the target environment. The code generator 608 may first translate the schema 602 into a language-agnostic model, which in turn is used by code generator 608 to generate the target-specific data models 612. For example, target-specific data model 612a and application 616a may correspond to a web-based target environment, and target-specific data model 612b and application 616b may correspond to an Android-based target environment. Other target environments are contemplated.

Alternatively, a communication protocol may be generic in nature and not require that any changes, related to the communication protocol, are needed during code generation. In this case, the code generator 608 may use the application environment specifications 604 without any communication protocol specification 606 to generate one or more target-specific data models 612.

The code generator 608 may be hosted or implemented in any suitable device in the distributed computing environment 100, such as any mesh network device 102, the hub 120, the cloud service 112, the partner cloud service 122, a computer workstation of the application developer 614, and so forth. For example, the cloud service 112 may include the code generator 608 to generate target-specific data models 612 for trait handlers of resources hosted in the cloud service 112.

Figure 7:
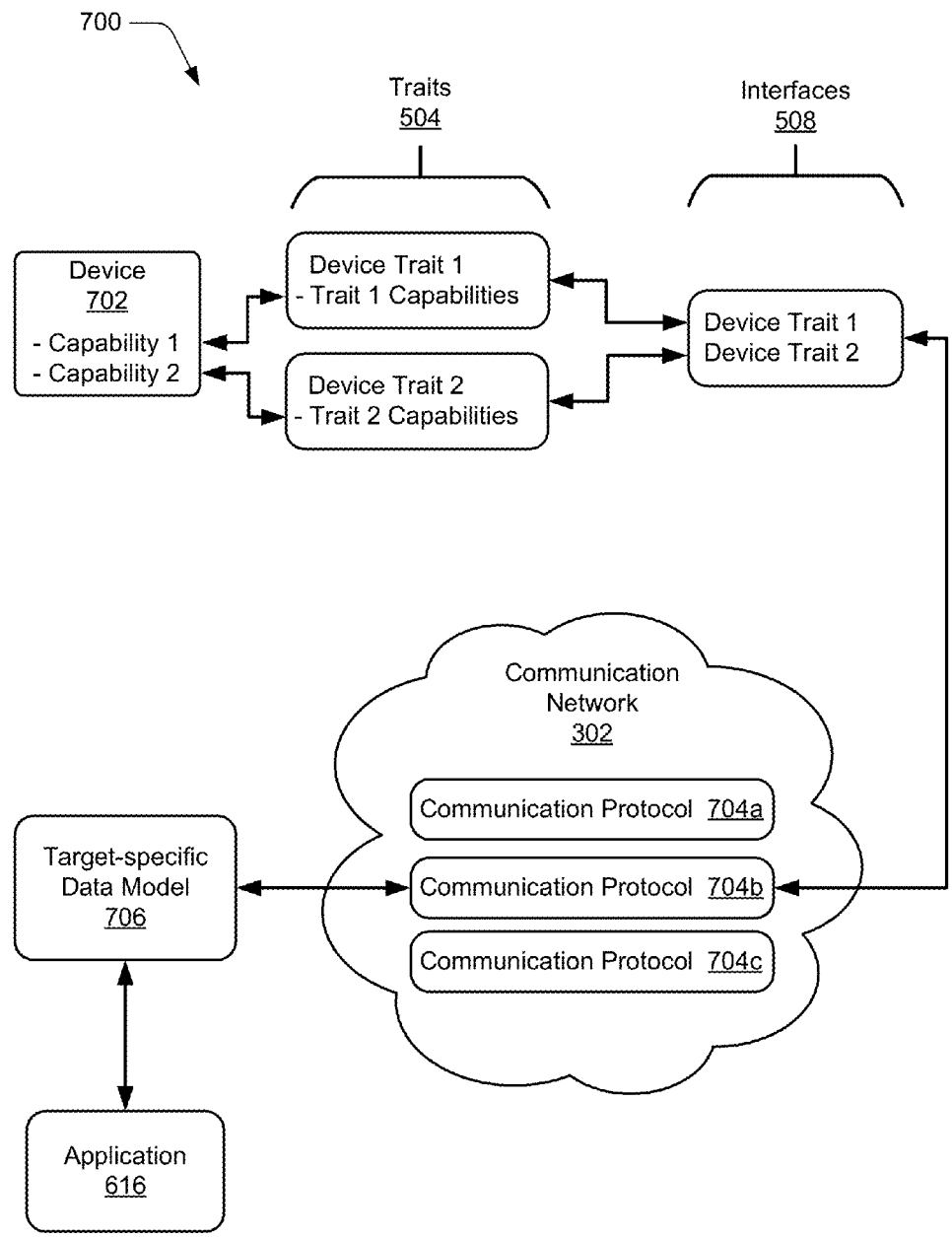
FIG. 7 illustrates an example of a target-specific data model in a distributed computing system in accordance with aspects of the device common model interface.

FIG. 7 illustrates a system 700 where code generation is used to provide the target-specific data model 612 for the application 616 using capabilities of a resource, which is illustrated as a device 702. Although the resource is illustrated as the device 702, the resource may alternatively be any resource in the distributed computing environment 100 that can be described by the data schema 502, as described above and below. A device may support a range of functionality from a simple sensor or control to a complex device with many capabilities. For example, the functionality available in the device 702 is generally referred to as "Capability 1" and "Capability 2." As discussed in detail above, these capabilities are described by the traits 504 and access to the traits 504 of the device 702 is provided by the interfaces 508.

Communication between the application 616 and the device 702 occurs over the communication network 302 using a communication protocol 704. In this example, three communication protocols 704a-c are illustrated as the communication protocol of the communication network. The device 702 is illustrated as using the communication protocol 704b. The application 616 uses a target-specific data model 706, which is the target-specific data model 612 that was produced by the code generator 608 for the communication protocol 704b and the application environment executing the application 616, as described above.

Figure 8:
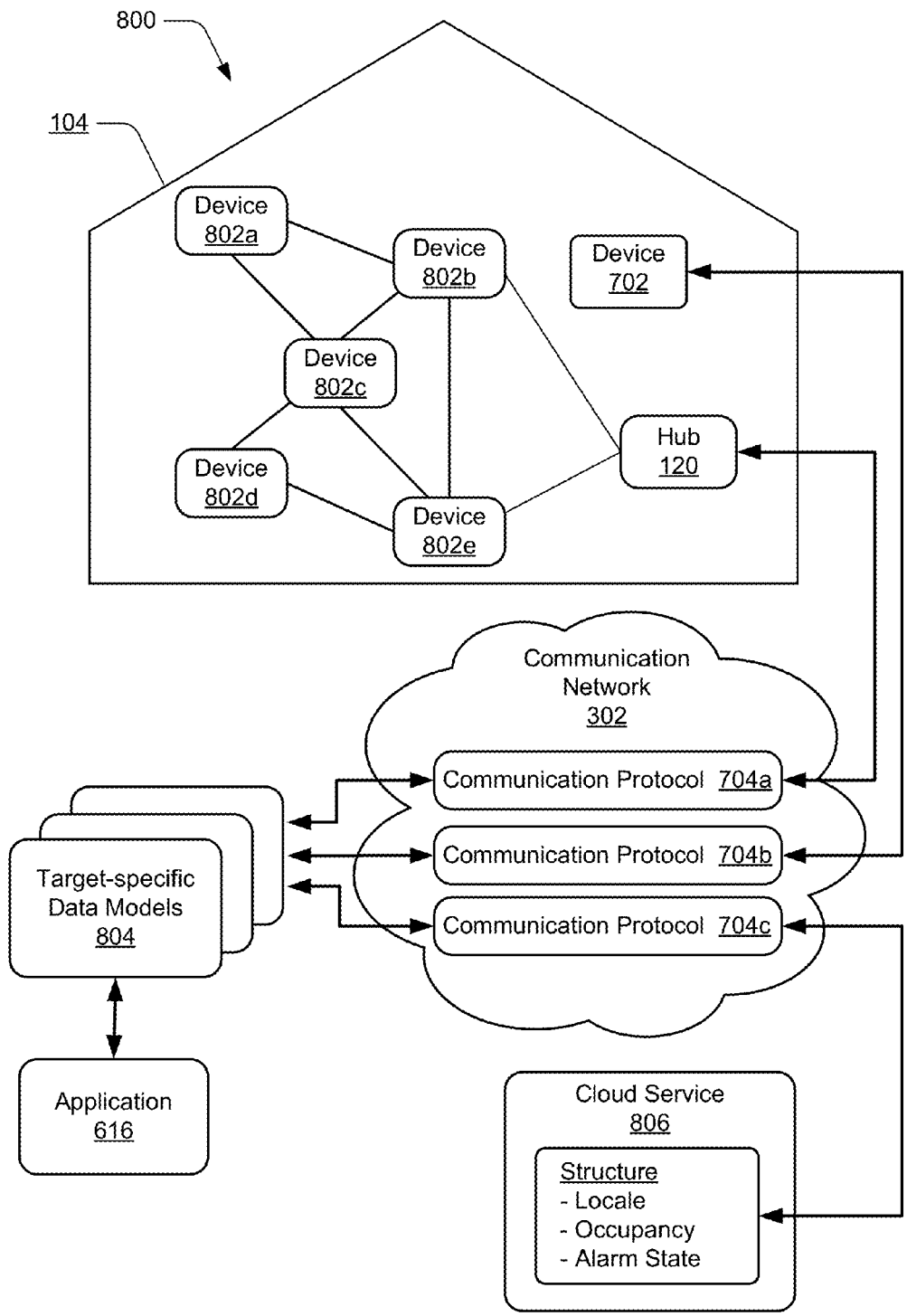
FIG. 8 illustrates an example of target-specific data models in a distributed computing system in accordance with aspects of the device common model interface.

FIG. 8 illustrates a system 800 where automatic code generation is used to provide target-specific data models 804 access the capabilities of devices and resources. The system 800 illustrates aspects of using the multiple target-specific data models 804 to access multiple devices and resources hosted at various locations. The traits 504 and the interfaces 508, as described in relation to FIG. 7, are also associated with the resources and devices in system 800, but are omitted for clarity of illustration. In the following examples related to FIG. 8, specific device types are discussed by way of example and not limitation. The device 702 and devices 802 can be any suitable device, such as those described with respect to FIG. 10, below.

The application 616 uses multiple target-specific data models 804 to access the device 702, the hub 120, the devices 802a-802e, and the cloud service 806. The device 702, the hub 120, and the devices 802a-802e are shown as disposed about the structure 104. The application 616 communicates with the hub 120 and devices 802 using the communication protocol 704a using the target-specific data model 804 generated for the communication protocol 704a.

Similarly, the application 616 communicates with the device 702 and the cloud service 806 using the communication protocols 704b and 704c, respectively, and using the target-specific data models 804 generated for the communication protocols 704b and 704c.

In an example, the devices 802 are lighting controllers that share a common set of traits, such as setting a lighting level, turning a light on or off, and so forth. The application 616 aggregates one or more common traits to control or determine a state of the devices 802. The application 616 can broadcast a command to the common trait in the aggregation, such as a command to turn the lights controlled by the devices 802, based on a time of day, or a location of the user of the application 616 crossing the boundary of a geofence, and so forth.

In another example, the devices 802 are security sensors and the hub 120 is a security hub for a security system for the structure 104. The status of various components of the structure 104 are used to determine if the structure 104 is secure. The developer of the application 616 for the security system may want to provide an indication in a user interface that the front door of the structure 104 is closed. Having a single resource for the front door that has a trait that indicates the open/closed status of the door is desirable. In the absence of the front door being able to directly communicate such a status, a front door resource can provide a trait for the open/closed state of the front door, and the hub 120 can host a controller for that trait. The controller subscribes to, or queries, status from one or more of the devices 802 that can provide relevant information to determine a status for the front door. The device 802a may be a security sensor device that can indicate whether the door is open or closed. The device 802b may be a lock device installed on the door that can determine whether the deadbolt of the lock is engaged in the door jam. The application 616 can determine the status of the front door from a single trait, which is abstracted from the statuses of the devices 802a and 802b, and is hosted in the front door resource in the hub 120.

In a further example, the application 616 can be a climate control application for the structure 104 that considers a number of factors to provide a comfortable environment for the occupants of the structure 104, while also minimizing energy costs. The application 616 and the associated cloud service 806 communicate with the device 702, which is a smart thermostat that controls the HVAC system in the structure 104.

Various factors can be considered in controlling the climate in the structure 104. For example, a resource, which can be hosted in the device 702, in the hub 120, or in the cloud service 806, includes a trait for occupancy of the structure 104 that indicates whether occupants are in the structure or not. The occupancy trait is a trait abstracted from suitable statuses in various devices 802 and the device 702. The application 616 can access the status of the occupancy trait from a single resource, and use the occupancy status to determine a setpoint for the thermostat, based on occupancy of the structure 104. The application 616 may incorporate other information, such as weather information, that is hosted on the cloud service 806, or a different cloud service.

Example method 900 is described with reference to respective FIG. 9 in accordance with one or more aspects of the device common model interface. Generally, any of the components, modules, methods, and operations described herein can be implemented using software, firmware, hardware (e.g., fixed logic circuitry), manual processing, or any combination thereof. Some operations of the example method may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 9:
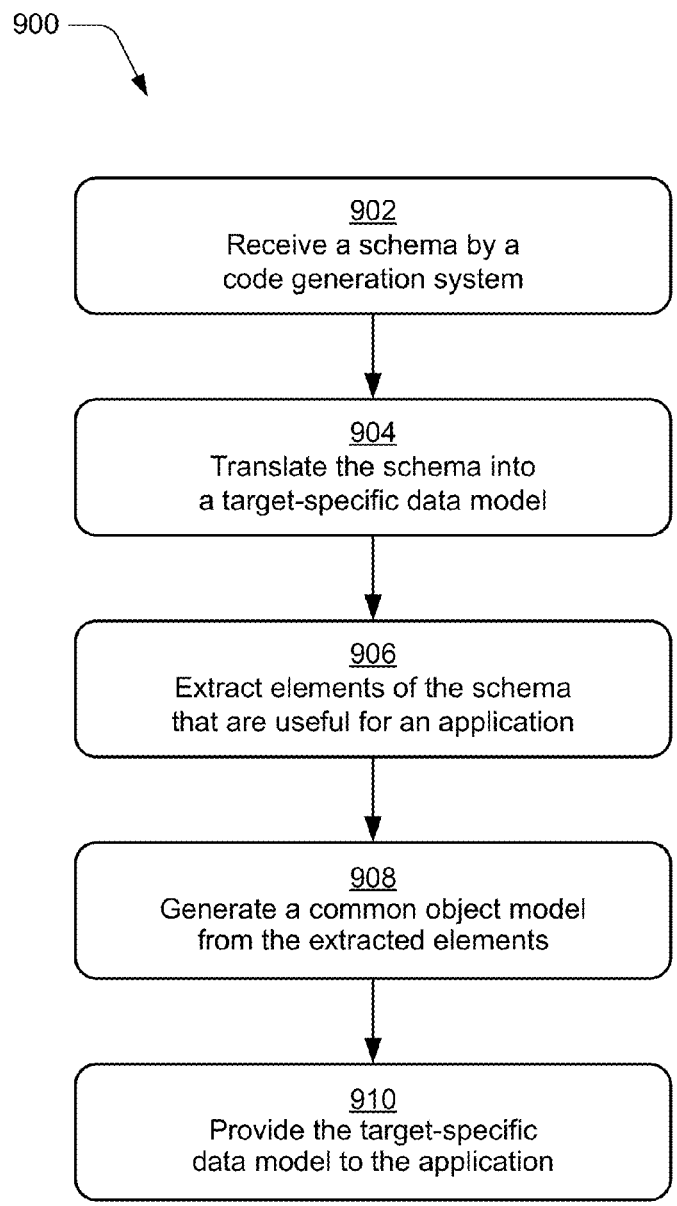
FIG. 9 illustrates an example method of the device common model interface as generally related to code generation of target-specific data models in the distributed computing system in accordance with the techniques described herein.

FIG. 9 illustrates example method(s) 900 of the device common model interface as generally related to code generation for target-specific data models and the common object model in the distributed computing system 100. The order in which the method blocks are described are not intended to be construed as a limitation, and any number of the described method blocks can be combined in any order to implement a method, or an alternate method.

At block 902, a code generation system receives a schema that describes a resource in a distributed computing environment or fabric network. For example, the code generator 608 receives the schema 602 that describes the traits 504 and the interfaces 508 of a resource 506.

At block 904, the code generation system translates the received schema into a target-specific data model based on a specification of a target application environment and a specification of a communication protocol. For example, the code generator 608 translates the received schema 602 into a target-specific data model 612, based on an application environment specification 604 and a communication protocol specification 606. The target-specific data model 612 includes an API specific to the target application environment and the communication protocol.

At block 906, the code generation system extracts elements of the schema that are useful for an application that communicates with the resource. For example, the code generator 608 evaluates each element in the received schema 602 to determine if the element is useful for an application 616 interacting with an interface of the resource described by the schema 602. The code generator 608 extracts the elements determined as useful from the received schema 602.

At block 908, the code generation system generates a common object model from the extracted elements in which the extracted elements are presented independent of the communication protocol. For example, the code generator 608 generates a common object model 610 that describes the resources 506, the traits 504, and the interfaces 508, independent of details of the communication protocol, which are useful to an application developer 614 in developing an application 616 that communicates with the resource.

At block 910, the code generation system provides the target-specific data model to the application. For example, the code generator 608 provides the target-specific data model 612 to the application. The application 616 interacts with the interface of the resource by using the API of the target-specific data model 612 to perform operations that are specific to communicating with the interface of the resource in the target application environment and using the communication protocol.

Figure 10:
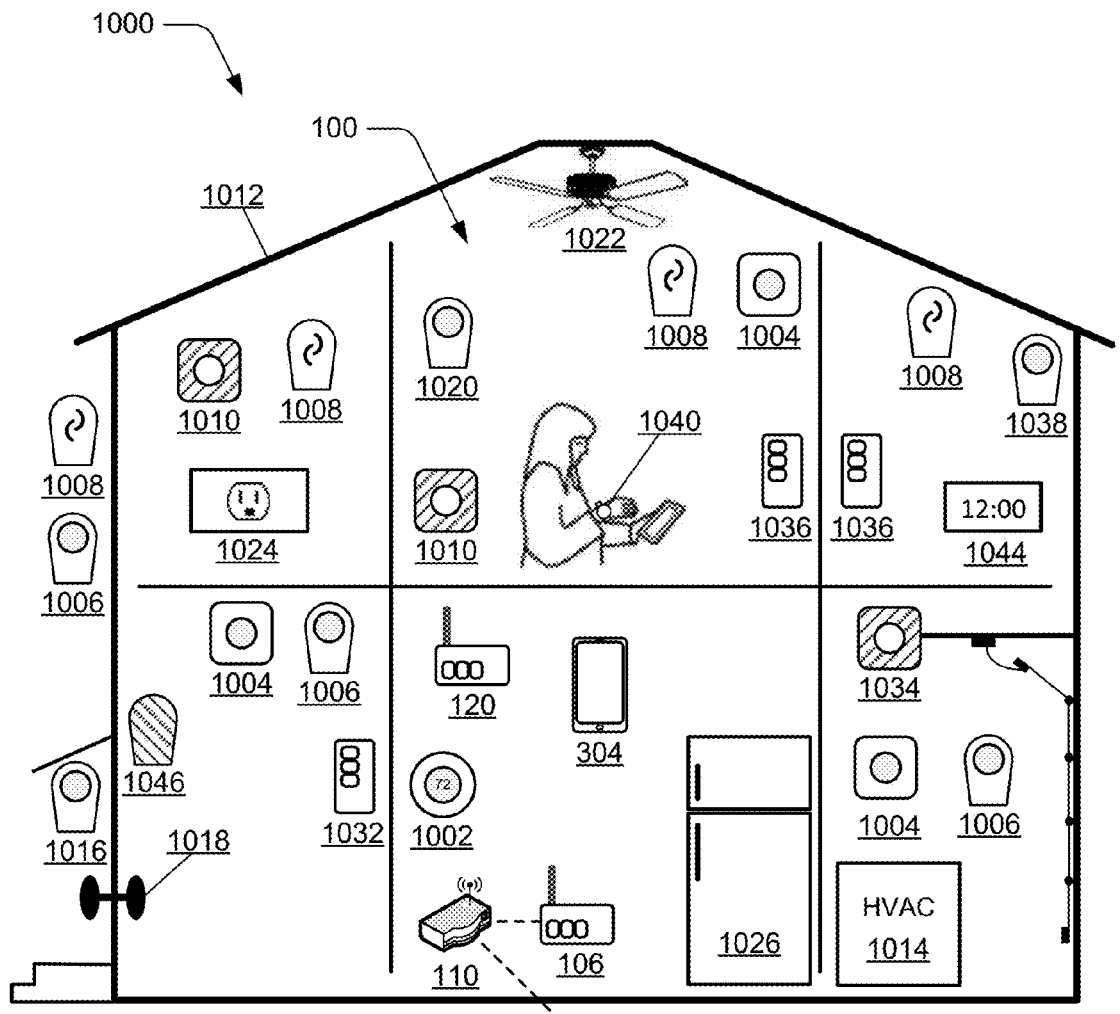
FIG. 10 illustrates an example environment in which a distributed computing system can be implemented in accordance with the techniques for the device common model interface described herein.

FIG. 10 illustrates an example environment 1000 in which the mesh network 100 (as described with reference to FIG. 1), and aspects of a device common model interface can be implemented. Generally, the environment 1000 includes the distributed computing system 100 implemented as part of a smart-home or other type of structure with any number of mesh network devices that are configured for communication in a mesh network. For example, the mesh network devices can include a thermostat 1002, hazard detectors 1004 (e.g., for smoke and/or carbon monoxide), cameras 1006 (e.g., indoor and outdoor), lighting units 1008 (e.g., indoor and outdoor), and any other types of mesh network devices 1010 that are implemented inside and/or outside of a structure 1012 (e.g., in a smart-home environment). In this example, the mesh network devices can also include any of the previously described devices, such as a border router 106, a leader device 306, a commissioning device 304, a hub device 120, as well as any of the devices implemented as a router 202, and/or an end device 206.

In the environment 1000, any number of the mesh network devices can be implemented for wireless interconnection to wirelessly communicate and interact with each other. The mesh network devices are modular, intelligent, multi-sensing, network-connected devices that can integrate seamlessly with each other and/or with a central server or a cloud-computing system to provide any of a variety of useful smart-home objectives and implementations. An example of a mesh network device that can be implemented as any of the devices described herein is shown and described with reference to FIG. 11.

In implementations, the thermostat 1002 may include a Nest® Learning Thermostat that detects ambient climate characteristics (e.g., temperature and/or humidity) and controls a HVAC system 1014 in the smart-home environment. The learning thermostat 1002 and other smart devices "learn" by capturing occupant settings to the devices. For example, the thermostat learns preferred temperature setpoints for mornings and evenings, and when the occupants of the structure are asleep or awake, as well as when the occupants are typically away or at home.

A hazard detector 1004 can be implemented to detect the presence of a hazardous substance or a substance indicative of a hazardous substance (e.g., smoke, fire, or carbon monoxide). In examples of wireless interconnection, a hazard detector 1004 may detect the presence of smoke, indicating a fire in the structure, in which case the hazard detector that first detects the smoke can broadcast a low-power wake-up signal to all of the connected mesh network devices. The other hazard detectors 1004 can then receive the broadcast wake-up signal and initiate a high-power state for hazard detection and to receive wireless communications of alert messages. Further, the lighting units 1008 can receive the broadcast wake-up signal and activate in the region of the detected hazard to illuminate and identify the problem area. In another example, the lighting units 1008 may activate in one illumination color to indicate a problem area or region in the structure, such as for a detected fire or break-in, and activate in a different illumination color to indicate safe regions and/or escape routes out of the structure.

In various configurations, the mesh network devices 1010 can include an entryway interface device 1016 that functions in coordination with a network-connected door lock system 1018, and that detects and responds to a person's approach to or departure from a location, such as an outer door of the structure 1012. The entryway interface device 1016 can interact with the other mesh network devices based on whether someone has approached or entered the smart-home environment. An entryway interface device 1016 can control doorbell functionality, announce the approach or departure of a person via audio or visual means, and control settings on a security system, such as to activate or deactivate the security system when occupants come and go. The mesh network devices 1010 can also include other sensors and detectors, such as to detect ambient lighting conditions, detect room-occupancy states (e.g., with an occupancy sensor 1020), and control a power and/or dim state of one or more lights. In some instances, the sensors and/or detectors may also control a power state or speed of a fan, such as a ceiling fan 1022. Further, the sensors and/or detectors may detect occupancy in a room or enclosure, and control the supply of power to electrical outlets or devices 1024, such as if a room or the structure is unoccupied.

The mesh network devices 1010 may also include connected appliances and/or controlled systems 1026, such as refrigerators, stoves and ovens, washers, dryers, air conditioners, pool heaters 1028, irrigation systems 1030, security systems 1032, and so forth, as well as other electronic and computing devices, such as televisions, entertainment systems, computers, intercom systems, garage-door openers 1034, ceiling fans 1022, control panels 1036, and the like. When plugged in, an appliance, device, or system can announce itself to the mesh network as described above, and can be automatically integrated with the controls and devices of the mesh network, such as in the smart-home. It should be noted that the mesh network devices 1010 may include devices physically located outside of the structure, but within wireless communication range, such as a device controlling a swimming pool heater 1028 or an irrigation system 1030.

As described above, the mesh network 200 includes a border router 106 that interfaces for communication with an external network 108, outside the mesh network 200. The border router 106 connects to an access point 110, which connects to the external communication network 108, such as the Internet. A cloud service 112, which is connected via the external communication network 108, provides services related to and/or using the devices within the mesh network 200. By way of example, the cloud service 112 can include applications for the commissioning device 304, such as smart phones, tablets, and the like, to devices in the mesh network, processing and presenting data acquired in the mesh network 200 to end users, linking devices in one or more mesh networks 200 to user accounts of the cloud service 112, provisioning and updating devices in the mesh network 200, and so forth. For example, a user can control the thermostat 1002 and other mesh network devices in the smart-home environment using a network-connected computer or portable device, such as a mobile phone or tablet device. Further, the mesh network devices can communicate information to any central server or cloud-computing system via the border router 106 and the access point 110. The data communications can be carried out using any of a variety of custom or standard wireless protocols (e.g., Wi-Fi, ZigBee for low power, 6LoWPAN, Bluetooth Low Energy, etc.) and/or by using any of a variety of custom or standard wired protocols (CAT6 Ethernet, HomePlug, etc.).

Any of the mesh network devices in the mesh network 200 can serve as low-power and communication nodes to create the mesh network 200 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 1040 detects that the room is dark and when the occupancy sensor 1020 detects that someone is in the room. Further, the sensor can include a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for a security system in the smart-home environment. For example, in the event a perpetrator circumvents detection by security sensors 1046 located at windows, doors, and other entry points of the structure or environment, an alarm could still be triggered by receiving an occupancy, motion, heat, sound, etc. message from one or more of the low-powered mesh nodes in the mesh network. In other implementations, the mesh network can be used to automatically turn on and off the lighting units 1008 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 1008 that lead to a safe exit. The light units 1008 may also be turned-on to indicate the direction along an exit route that a person should travel to safely exit the structure.

The various mesh network devices may also be implemented to integrate and communicate with wearable computing devices 1042, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 1010 may also include a smart alarm clock 1044 for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 1002 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 1002 so as to pre-heat or cool the environment to a desired setting, and turning-on or turning-off the lights 1008.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

Figure 11:
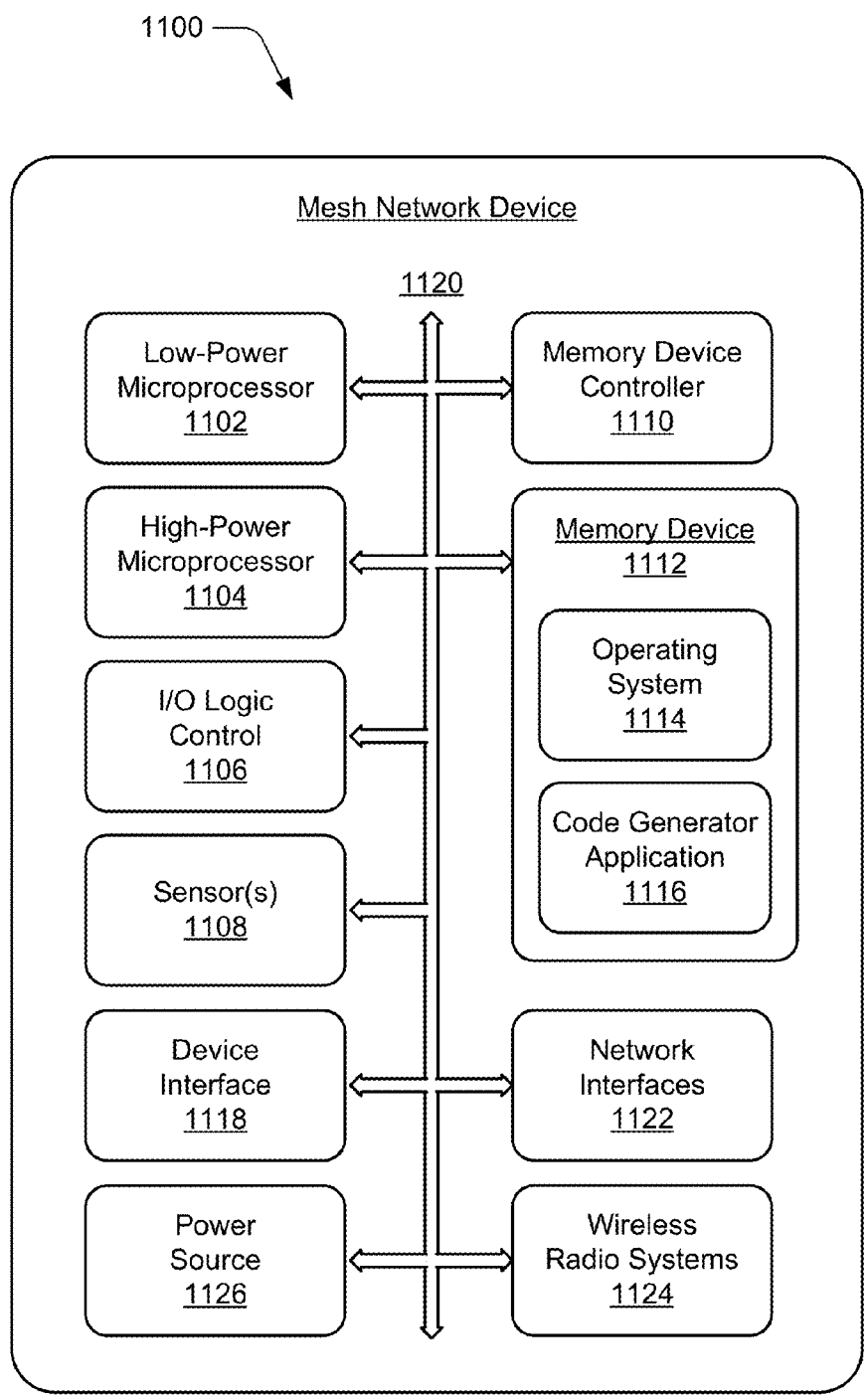
FIG. 11 illustrates an example mesh network device that can be implemented in a distributed computing environment in accordance with one or more the techniques described herein.

FIG. 11 illustrates an example mesh network device 1100 that can be implemented as any of the mesh network devices in a mesh network in accordance with one or more embodiments of the device common model interface as described herein. The device 1100 can be integrated with electronic circuitry, microprocessors, memory, input output (I/O) logic control, communication interfaces and components, as well as other hardware, firmware, and/or software to implement the device in a mesh network. Further, the mesh network device 1100 can be implemented with various components, such as with any number and combination of different components as further described with reference to the example device shown in FIG. 11.

In this example, the mesh network device 1100 includes a low-power microprocessor 1102 and a high-power microprocessor 1104 (e.g., microcontrollers or digital signal processors) that process executable instructions. The device also includes an input-output (I/O) logic control 1106 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 1102 and the high-power microprocessor 1104 can also support one or more different device functionalities of the device. For example, the high-power microprocessor 1104 may execute computationally intensive operations, whereas the low-power microprocessor 1102 may manage less complex processes such as detecting a hazard or temperature from one or more sensors 1108. The low-power processor 1102 may also wake or initialize the high-power processor 1104 for computationally intensive processes.

The one or more sensors 1108 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 1108 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 1100 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 1100 includes a memory device controller 1110 and a memory device 1112, such as any type of a nonvolatile memory and/or other suitable electronic data storage device. The mesh network device 1100 can also include various firmware and/or software, such as an operating system 1114 that is maintained as computer executable instructions by the memory and executed by a microprocessor. The device software may also include a code generator application 1116 that implements aspects of the device common model interface. The mesh network device 1100 also includes a device interface 1118 to interface with another device or peripheral component, and includes an integrated data bus 1120 that couples the various components of the mesh network device for data communication between the components. The data bus in the mesh network device may also be implemented as any one or a combination of different bus structures and/or bus architectures.

The device interface 1118 may receive input from a user and/or provide information to the user (e.g., as a user interface), and a received input can be used to determine a setting. The device interface 1118 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1118 may also receive inputs from any number of peripherals, such as buttons, a keypad, a switch, a microphone, and an imager (e.g., a camera device).

The mesh network device 1100 can include network interfaces 1122, such as a mesh network interface for communication with other mesh network devices in a mesh network, and an external network interface for network communication, such as via the Internet. The mesh network device 1100 also includes wireless radio systems 1124 for wireless communication with other mesh network devices via the mesh network interface and for multiple, different wireless communications systems. The wireless radio systems 1124 may include Wi-Fi, Bluetooth™, Mobile Broadband, Bluetooth Low Energy (BLE), and/or point-to-point IEEE 802.15.4. Each of the different radio systems can include a radio device, antenna, and chipset that is implemented for a particular wireless communications technology. The mesh network device 1100 also includes a power source 1126, such as a battery and/or to connect the device to line voltage. An AC power source may also be used to charge the battery of the device.

Figure 12:
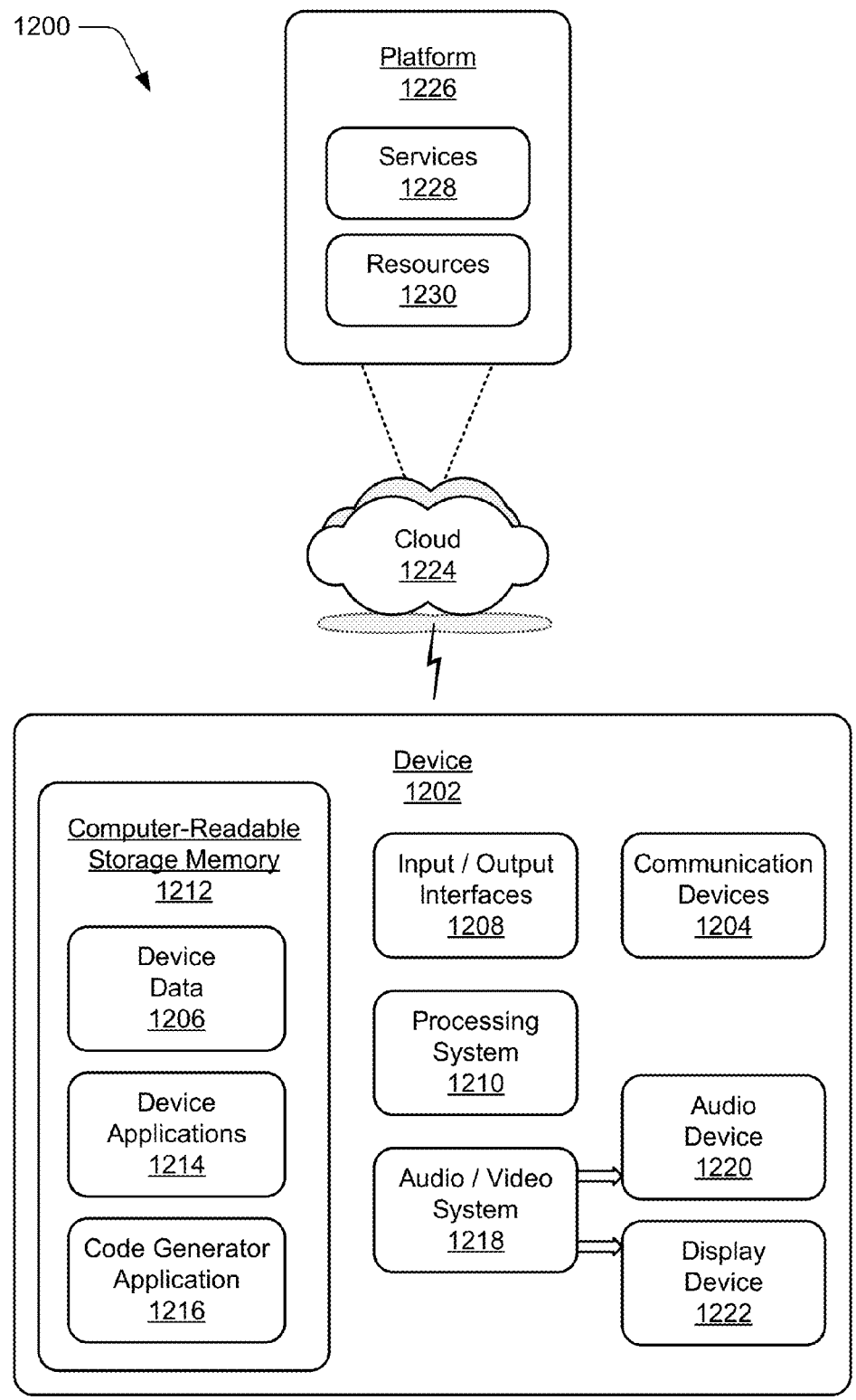
FIG. 12 illustrates an example system with an example device that can implement aspects of the device common model interface.

FIG. 12 illustrates an example system 1200 that includes an example device 1202, which can be implemented as any of the mesh network devices, computing devices, and/or cloud-based services that implement aspects of the device common model interface as described with reference to the previous FIGS. 1-11. The example device 1202 may be any type of computing device, client device, mobile phone, tablet, communication, entertainment, gaming, media playback, computer server, cloud-based server, mesh network device, and/or other type of device. Further, the example device 1202 may be implemented as any other type of mesh network device that is configured for communication on a mesh network, such as a thermostat, hazard detector, camera, light unit, commissioning device, router, border router, joiner router, joining device, end device, leader, access point, a hub, and/or other mesh network devices.

The device 1202 includes communication devices 1204 that enable wired and/or wireless communication of device data 1206, such as data that is communicated between the devices in a mesh network, data that is being received, data scheduled for broadcast, data packets of the data, data that is synched between the devices, etc. The device data can include any type of communication data, as well as audio, video, and/or image data that is generated by applications executing on the device. The communication devices 1204 can also include transceivers for cellular phone communication and/or for network data communication.

The device 1202 also includes input/output (I/O) interfaces 1208, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 1202 includes a processing system 1210 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1202 may further include any type of a system bus or other data and command transfer system that couples the various components within the device. A system bus can include any one or combination of different bus structures and architectures, as well as control and data lines.

The device 1202 also includes computer-readable storage memory 1212, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1212 provides storage of the device data 1206 and various device applications 1214, such as an operating system that is maintained as a software application with the computer-readable storage memory and executed by the processing system 1210. The device applications may also include a device manager, such as any form of a control application, software application, signal processing and control module, code that is native to a particular device, a hardware abstraction layer for a particular device, and so on. In this example, the device applications also include a code generator application 1216 that implements aspects of the device common model interface, such as when the example device 1202 is implemented as any of the mesh network devices, computing devices, and/or cloud-based services described herein.

The device 1202 also includes an audio and/or video system 1218 that generates audio data for an audio device 1220 and/or generates display data for a display device 1222. The audio device and/or the display device include any devices that process, display, and/or otherwise render audio, video, display, and/or image data, such as the image content of a digital photo. In implementations, the audio device and/or the display device are integrated components of the example device 1202. Alternatively, the audio device and/or the display device are external, peripheral components to the example device. In embodiments, at least part of the techniques described for the device common model interface may be implemented in a distributed system, such as over a "cloud" 1224 in a platform 1226. The cloud 1224 includes and/or is representative of the platform 1226 for services 1228 and/or resources 1230.

The platform 1226 abstracts underlying functionality of hardware, such as server devices (e.g., included in the services 1228) and/or software resources (e.g., included as the resources 1230), and connects the example device 1202 with other devices, servers, etc. The resources 1230 may also include applications, such as the code generator 608, and/or data that can be utilized while computer processing is executed on servers that are remote from the example device 1202. Additionally, the services 1228 and/or the resources 1230 may facilitate subscriber network services, such as over the Internet, a cellular network, or Wi-Fi network. The platform 1226 may also serve to abstract and scale resources to service a demand for the resources 1230 that are implemented via the platform, such as in an interconnected device embodiment with functionality distributed throughout the system 1200. For example, the functionality may be implemented in part at the example device 1202 as well as via the platform 1226 that abstracts the functionality of the cloud 1224.

Although aspects of the device common model have been described in language specific to features and/or methods, the subject of the appended claims is not necessarily limited to the specific features or methods described. Rather, the specific features and methods are disclosed as example implementations of code generation of target-specific data models, and other equivalent features and methods are intended to be within the scope of the appended claims. Further, various different embodiments are described and it is to be appreciated that each described embodiment can be implemented independently or in connection with one or more other described embodiments.

The invention claimed is:

1. A code generation system comprising:
   a memory configured to store application environment specifications and communication protocol specifications, an application environment specification specifying a target application environment of an application, and a communication protocol specification specifying a communication protocol;
   a processor system to implement a code generation application that is configured to:
      receive a schema, the schema describing a resource in a smart-home environment, the schema including a description of the resource, one or more traits of the resource, and one or more interfaces of the resource, each of the one or more interfaces of the resource providing access to functionality of the resource, and the functionality comprising at least one of the one or more traits of the resource, and each of the one or more interfaces providing semantic meaning to operation of the functionality of the one or more traits of the resource;
      translate the received schema into a target-specific data model, the translation based on the application environment specification of the target application environment and the communication protocol specification that is associated with the communication protocol used for communication with the resource in the smart-home environment, the target-specific data model comprising an Application Programming Interface (API) specific to the target application environment and the communication protocol;
      extract elements of the received schema that are usable by the application that communicates with the resource using an interface of the resource;

using the extracted elements, generate a common object model in which the extracted elements are presented for an application developer, independent of the communication protocol; and provide the target-specific data model to the application that interacts with the interface of the resource by using the API of the target-specific data model to perform operations that are specific to communicating with the interface of the resource in the target application environment and using the communication protocol supported by the resource for communication in the smart-home environment.

2. The code generation system of claim 1, wherein the resource is hosted on a service, and wherein the schema describes one or more traits of the service.

3. The code generation system of claim 2, wherein the service is hosted on a mesh network device, a hub device, or a cloud-based service.

4. The code generation system of claim 1, wherein the resource is a mesh network device.

5. The code generation system of claim 4, wherein the mesh network device is one of: a thermostat, a hazard detector, a camera, a security sensor, or a hub.

6. The code generation system of claim 1, the code generation application further configured to:

receive another schema that describes another resource in the smart-home environment;

translate the other schema into a different target-specific data model, the translation based on the application environment specification of the target application environment and based on a different communication protocol specification that is associated with a different communication protocol used for communication with the other resource in the smart-home environment, the different target-specific data model comprising an API specific to the target application environment and the different communication protocol;

extract elements of the other schema that are usable by the application to communicate with the other resource using an interface of the other resource;

using the extracted elements of the other schema, generate a different common object model in which the extracted elements are presented for the application developer, independent of the different communication protocol; and provide the different target-specific data model to the application that interacts with the interface of the other resource by using the API of the different target-specific data model, to perform operations that are specific to communicating with the interface of the other resource in the target application environment and using the different communication protocol.

7. The code generation system of claim 1, wherein the code generation system is hosted on one of: a cloud-based service, a computing device, or a mesh network device.

8. The code generation system of claim 1, wherein the target application environment is one of: an Android environment, an iOS environment, or a web-based environment.

9. The code generation system of claim 1, wherein the communication protocol is one of: an IEEE 802.15.4 protocol, a Thread network protocol, a fabric network protocol, a Bluetooth Low Energy (BLE) protocol, a Transmission Control Protocol (TCP) over Internet Protocol (IP), or a User Datagram Protocol (UDP) over IP.

10. A method for generating a target-specific data model for a resource in a smart-home environment, the method comprising:

receiving, by a computing device, a schema describing the resource in the smart-home environment, the schema including a description of the resource, one or more traits of the resource, and one or more interfaces of the resource, each of the one or more interfaces of the resource providing access to functionality of the resource, and the functionality comprising at least one of the one or more traits of the resource, and each of the one or more interfaces providing semantic meaning to operation of the functionality of the one or more traits of the resource;

translating, by the computing device, the received schema into the target-specific data model, the translating using an application environment specification of a target application environment and a communication protocol specification, the target-specific data model comprising an Application Programming Interface (API) specific to the target application environment and a communication protocol specified by the communication protocol specification, the communication protocol being used for communication with the resource in the smart-home environment;

extracting elements of the received schema that are usable by an application that communicates with the resource using an interface of the resource;

based on the extracting the elements, generating a common object model in which the extracted elements are presented for an application developer, independent of the communication protocol; and providing the target-specific data model to the application that interacts with the interface of the resource by using the API of the target-specific data model to perform operations that are specific to communicating with the interface of the resource in the target application environment and using the communication protocol.

11. The method of claim 10, wherein the resource is hosted on a service, wherein the schema describes traits of the service, and wherein the service is hosted on a mesh network device, a hub device, or a cloud-based service.

12. The method of claim 10, wherein the resource is a mesh network device, and wherein the mesh network device is one of: a thermostat, a hazard detector, a camera, a security sensor, or a hub.

13. The method of claim 10, the method further comprising:

receiving another schema that describes another resource in the smart-home environment;

translating, by the computing device, the other received schema into a different target-specific data model, the translation based on the application environment specification of the target application environment and based on a different communication protocol specification that is associated with a different communication protocol used for communication with the other resource in the smart-home environment, the other target-specific data model comprising an API specific to the target application environment and the different communication protocol;

extracting elements of the other schema that are usable by the application to communicate with the other resource using an interface of the other resource;

based on the extracting the elements of the other schema, generating another common object model in which the extracted elements are presented for the application developer, independent of the different communication protocol; and providing the different target-specific data model to the application that interacts with the interface of the other resource by using the API of the different target-specific data model to perform operations that are specific to communicating with the interface of the other resource in the target application environment and using the different communication protocol.

14. The method of claim 10, wherein the target application environment is one of: an Android environment, an iOS environment, or a web-based environment.

15. The method of claim 10, wherein the communication protocol is one of: an IEEE 802.15.4 protocol, a Thread network protocol, a fabric network protocol, a Bluetooth Low Energy (BLE) protocol, a Transmission Control Protocol (TCP) over Internet Protocol (IP), or a User Datagram Protocol (UDP) over IP.

16. A computer-readable memory device comprising instructions executable by a computing device to perform operations comprising:

receiving a schema describing a resource in a smart-home environment, the schema including a description of the resource, one or more traits of the resource, and one or more interfaces of the resource, each of the one or more interfaces of the resource providing access to functionality of the resource, and the functionality comprising at least one of the one or more traits of the resource, and each of the one or more interfaces providing semantic meaning to operation of the functionality of the one or more traits of the resource;

translating the received schema into a target-specific data model, the translating using an application environment specification of a target application environment and a communication protocol specification, the target-specific data model comprising an Application Programming Interface (API) specific to the target application environment and a communication protocol specified by the communication protocol specification, the communication protocol being used for communication with the resource in the smart-home environment;

extracting elements of the received schema that are usable by an application that communicates with the resource using an interface of the resource;

based on the extracting the elements, generating a common object model in which the extracted elements are presented for an application developer, independent of the communication protocol; and providing the target-specific data model to the application that application interacts with the interface of the resource by using the API of the target-specific data model to perform operations that are specific to communicating with the interface of the resource in the target application environment and using the communication protocol.

17. The computer-readable memory device of claim 16, wherein the resource is hosted on a service, wherein the schema describes traits of the service, and wherein the service is hosted on a mesh network device, a hub device, or a cloud-based service.

18. The computer-readable memory device of claim 16, comprising instructions executable to perform operations further comprising:

receiving another schema that describes another resource in the smart-home environment;

translating the other received schema into a different target-specific data model, the translation based on the application environment specification of the target application environment and based on a different communication protocol specification that is associated with a different communication protocol used for communication with the other resource in the smart-home environment, the other target-specific data model comprising an API specific to the target application environment and the different communication protocol;

extracting elements of the other schema that are usable by the application to communicate with the other resource using an interface of the other resource;

based on the extracting the elements of the other schema, generating another common object model in which the extracted elements are presented for the application developer, independent of the different communication protocol; and providing the different target-specific data model to the application that interacts with the interface of the other resource by using the API of the different target-specific data model to perform operations that are specific to communicating with the interface of the other resource in the target application environment and using the different communication protocol.

19. The computer-readable memory device of claim 16, wherein the target application environment is one of: an Android environment, an iOS environment, or a web-based environment.

20. The computer-readable memory device of claim 16, wherein the communication protocol is one of: an IEEE 802.15.4 protocol, a Thread network protocol, a fabric network protocol, a Bluetooth Low Energy (BLE) protocol, a Transmission Control Protocol (TCP) over Internet Protocol (IP), or a User Datagram Protocol (UDP) over IP.

* * * * *